US009729676B2

(12) United States Patent
Kobayashi et al.

(10) Patent No.: US 9,729,676 B2
(45) Date of Patent: *Aug. 8, 2017

(54) METHOD OF AUTONOMIC REPRESENTATIVE SELECTION IN LOCAL AREA NETWORKS

(71) Applicant: International Business Machines Corporation, Armonk, NY (US)

(72) Inventors: Kenji Kobayashi, Tokyo (JP); Takeshi Kuwahara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 14/554,490

(22) Filed: Nov. 26, 2014

(65) Prior Publication Data
US 2015/0081782 A1    Mar. 19, 2015

Related U.S. Application Data

(60) Continuation of application No. 14/457,404, filed on Aug. 12, 2014, which is a continuation of application
(Continued)

(51) Int. Cl.
G06F 15/16        (2006.01)
H04L 29/06        (2006.01)
(Continued)

(52) U.S. Cl.
CPC .......... H04L 67/42 (2013.01); H04L 12/1854 (2013.01); H04L 29/08072 (2013.01);
(Continued)

(58) Field of Classification Search
CPC .......................... H04L 29/06; H04L 29/08072
(Continued)

(56) References Cited

U.S. PATENT DOCUMENTS 5,826,027 A    10/1998  Pedersen et al.
5,848,228 A    12/1998  Simatic et al.
(Continued)

FOREIGN PATENT DOCUMENTS

JP    2003186765 A    7/2003
JP    2004304799 A    10/2003
JP    2008250403 A    10/2008

OTHER PUBLICATIONS

Kobayashi et al., "Method of Autonomic Representative Selection in Local Area Networks", U.S. Appl. No. 15/448,623, filed Mar. 3, 2017, 20 pages.
(Continued)

Primary Examiner — Khanh Dinh
(74) Attorney, Agent, or Firm — David B. Woycechowsky

(57) ABSTRACT

A method and apparatus for selecting a client computer as a relay server to rebroadcast common application information that is broadcast from a server system over a network. The client computer is selected randomly to rebroadcast the User Datagram Protocol (UDP) information received from the server system and client computers receiving the UDP information from another client computer relay server on the network do not rebroadcast the information. If the client computer selected to rebroadcast the common information fails to rebroadcast, another client computer is randomly selected as a relay server and takes over rebroadcasting the common information.

16 Claims, 11 Drawing Sheets

Related U.S. Application Data

No. 13/232,083, filed on Sep. 14, 2011, now Pat. No. 8,930,445, which is a division of application No. 12/547,719, filed on Aug. 26, 2009, now Pat. No. 8,086,734.

(51) Int. Cl.
   *H04L 29/08* (2006.01)
   *H04L 12/18* (2006.01)
   *H04L 12/701* (2013.01)
   *H04L 29/14* (2006.01)

(52) U.S. Cl.
   CPC .......... *H04L 45/00* (2013.01); *H04L 12/1886* (2013.01); *H04L 69/40* (2013.01)

(58) Field of Classification Search
   USPC ................................. 709/203, 220, 224, 228
   See application file for complete search history.

(56) References Cited

U.S. PATENT DOCUMENTS

| | | | |
|---|---|---|---|
| 6,275,224 B1 | 8/2001 | Carter | |
| 6,901,047 B1 | 5/2005 | Griffith et al. | |
| 7,069,296 B2 | 6/2006 | Moller et al. | |
| 7,184,421 B1 | 2/2007 | Liu et al. | |
| 7,480,848 B2 | 1/2009 | JiJina et al. | |
| 7,525,963 B2 | 4/2009 | Su et al. | |
| 7,743,094 B2 | 6/2010 | Metke et al. | |
| 7,839,926 B1* | 11/2010 | Metzger | H04N 5/144 375/240.01 |
| 7,891,560 B2 | 2/2011 | Hammad | |
| 7,966,368 B2 | 6/2011 | Su et al. | |
| 8,086,734 B2* | 12/2011 | Kobayashi | H04L 12/1854 709/226 |
| 8,095,466 B2* | 1/2012 | Kahn | G06Q 20/382 348/465 |
| 8,780,724 B2* | 7/2014 | Zhang | H04L 12/437 370/237 |
| 8,914,543 B2* | 12/2014 | Jasen | H04L 47/10 370/338 |
| 8,930,445 B2* | 1/2015 | Kobayashi | H04L 12/1854 709/203 |
| 9,112,947 B2* | 8/2015 | Labonte | H04L 47/10 |
| 9,529,837 B2* | 12/2016 | Meng | G06F 17/3033 |
| 2002/0091991 A1 | 7/2002 | Castro | |
| 2003/0009603 A1* | 1/2003 | Ruths | G06F 9/465 719/318 |
| 2008/0250443 A1 | 10/2008 | Fan et al. | |
| 2011/0055311 A1 | 3/2011 | Kobayashi et al. | |
| 2012/0005271 A1 | 1/2012 | Kobayashi et al. | |

OTHER PUBLICATIONS

Office Action (mail date Jun. 26, 2012) for U.S. Appl. No. 13/232,083, filed Sep. 14, 2011; Conf. No. 3799.
Jul. 14, 2012 Filed Resp. to Off. Act. (Final) (mail dt. Jun. 26, 2012) for U.S. Appl. No. 13/232,083, filed Sep. 14, 2011, Conf. No. 3799.
Not. of Allowance and Fee(s) Due (mail dt. Jun. 11, 2014) for U.S. Appl. No. 13/232,083, filed Sep. 14, 2011, Conf. No. 3799.
Office Action (mail date Mar. 25, 2011) for U.S. Appl. No. 12/547,719, filed Aug. 26, 2009, Conf. No. 5785.
Apr. 25, 2011 Filed Resp. to Office Act. (mail dt. Mar. 25, 2011) for U.S. Appl. No. 12/547,719, filed Aug. 26, 2009, Conf. No. 5785.
Not of Allowance and Fee(s) Due (mail dt. Aug. 23, 2011) for U.S. Appl. No. 12/547,719, filed Aug. 26, 2009, Conf. No. 5785.
Sep. 7, 2011 Filed Resp.to Not.of Allow.and Fees(s) Due(mail dt. Aug. 23, 2011)for U.S. Appl. No. 12/547,719, filed Aug. 26, 2009, Conf. No. 5785.
Suppl. Not. of Allow. (mail dt. Sep. 21, 2011) for U.S. Appl. No. 12/547,719, filed Aug. 26, 2009, Cong. No. 5785.
"Leader election" Wikipedia, the free encyclopedia. Last modified Mar. 9, 2009, http://en.Wikipedia.org/Wiki/Leader_election.
Not of Informal Appl. (mail dt. Sep. 27, 2011) for U.S. Appl. No. 13/232,083, filed Sep. 14, 2011; Conf. No. 3799.
Sep. 30, 2011 Filed Resp. to Not. of Informal Appl. (mail dt. Sep. 27, 2011) for U.S. Appl. No. 13/232,083, filed Sep. 14, 2011; Conf. No. 3799.
Office Action (mail dt. Mar. 5, 2012) for U.S. Appl. No. 13/232,083, filed Sep. 14, 2011; Conf. No. 3799.
May 16, 2012 Filed Resp. to Office Action (mail dt. Mar. 5, 2012) for U.S. Appl. No. 13/232,083, filed Sep. 14, 2011; Conf. No. 3799.

* cited by examiner

METHOD OF AUTONOMIC REPRESENTATIVE SELECTION IN LOCAL AREA NETWORKS

The present application is a continuation application of a co-pending application Ser. No. 14/457,404, filed Aug. 12, 2014, which application is a continuation application of application Ser. No. 13/232,083, filed Sep. 14, 2011, allowed Jun. 11, 2014, which application is a divisional application of application Ser. No. 12/547,719, filed Aug. 26, 2009 and issued on Dec. 27, 2011 as U.S. Pat. No. 8,086,734.

BACKGROUND OF THE INVENTION

1. Field of the Invention

The present invention relates to networking methods and systems, and more particularly, to networking methods and systems for autonomic representative selection of a client computer for broadcasting server common information in local area networks.

2. Background and Related Art

In networking systems, it is sometimes necessary for a server to send common information to a plurality of clients in the connected network. Examples of such information may be "call waiting" information as generated at call centers. For example, call centers produce waiting queues for handling customer call loads. "Call waiting" information may include the number of waiting customers and queue ids. Such information continually changes and must be provided to the call takers manning client workstations so as to effectively manage the call center operation.

One technique for sending common information to is to use what is known as a UDP (User Datagram Protocol) broadcast of the information from the server to client workstations. However, in a WAN there is often the possibility within the network that network equipment is incapable or unable to carry out a UDP broadcast. For example, there may be routers in the network that block data transmission for security reasons.

To overcome such possibility, network designs have been configured to enable each client to use TCP communications and to independently make a request for the required information from the server. Alternatively, a broadcast server may be used within a segment of the WAN, such as, a LAN but such an arrangement typically increases costs.

SUMMARY OF THE PRESENT INVENTION

In accordance with the embodiments of the present invention, a method and system is provided for automatically determining or selecting one client workstation as a relay server for broadcasting in a network segment, using broadcast processing on the network. Client workstations in a network segment to which they belong, i.e. within the range where broadcast is possible, act in competition with one another to carry out broadcast processing within the segment. Only the winner of the competition continues broadcasting. If an error or default occurs in the winner, the competition starts over again, and another winner is found from among the remaining workstations to carry out broadcasting.

Embodiments of the invention are generally directed network systems and methods employing UDP broadcasting of information from a server to clients over a network wherein, through autonomic selection, a single client within a segment of the network undertakes broadcast processing within the segment, acting as a relay server. This single client, acting as a relay server, communicates with the central server to obtain application data for rebroadcasting to the other clients within the segment.

Where the selected rebroadcasting client fails, for some reason, to rebroadcast, a new client is automatically selected from within the segment to rebroadcast the datagram information from the server. Typically, as used herein, the term "rebroadcasting" is used to describe client computer broadcasting of server system UDP broadcast information. The term "broadcasting" or "broadcast" is typically used to describe UDP information broadcast by the server.

According to one embodiment of the invention, there is provided a method of broadcasting common information over a computer network, comprising the steps of:

broadcasting said common information from a network server to a plurality of network clients for possible rebroadcasting to the other clients of said plurality of clients;

selecting from among said plurality of clients at least one such client to rebroadcast said common information to the remaining clients; and causing each of the remaining clients to block rebroadcasting from the client when said at least one such client is selected to rebroadcast said common information to said remaining clients.

The above method further comprises the step wherein broadcasting said common information to said plurality of clients is broadcast using user datagram protocol.

The above method comprises the further step wherein said at least one client selected from among said plurality of clients to rebroadcast said common information is selected from among said plurality of clients by randomly assigning different fixed time intervals for each client to rebroadcast said common information.

The above method further comprises the step wherein the client randomly assigned the shortest time interval for rebroadcasting is selected from among said plurality of clients for rebroadcasting said common information.

The above method further includes the step wherein failure of said client selected from among said plurality of clients to rebroadcast said common information causes another client to be selected from among said plurality of clients to take over rebroadcasting said common information to the remaining plurality of clients within said network.

The above method also includes the step wherein the client of said plurality of clients first receiving said common information from said server within a predetermined fixed cycle of time after failure is selected for rebroadcasting from among said plurality of clients for continuing rebroadcast of said common information.

The above method still further includes the step wherein said predetermined fixed cycle of time occurs at different times for each client of said plurality of clients.

According to another embodiment of the invention there is provided a network communication method, comprising the steps of:

broadcasting common information using user datagram protocol from a server to a plurality of network clients;

randomly selecting at least one of said network clients as a relay server to rebroadcast to said common information to the plurality of clients not selected; and blocking the rebroadcasting of said common information in each of said plurality of clients not selected.

According to still another embodiment of the invention there is provided a network system, comprising:

a network server arranged to broadcast common information to clients;

a plurality of clients connected to said server through said network to receive said broadcast common information;

each of said plurality of clients arranged to rebroadcast said common information; and each of said plurality of clients provided with a different fixed time interval for rebroadcasting said common information with said client with the shortest fixed time interval selected from said plurality of clients connected to said network as a relay server to rebroadcast said common information to the remaining ones of said plurality of clients.

The above network system embodiments further include:

the network system wherein failure of the client selected from among the plurality of clients to rebroadcast said common information acts to cause another client to be selected to take over rebroadcasting common information to the remaining plurality of clients after receiving said common information from said server;

the network system wherein said another client selected to take over rebroadcasting is the first client to receive said common information from said server within a completed fixed cycle of time;

the network system wherein said fixed cycle of time is the same for each of said plurality of clients and occurs at different times for each of said plurality of clients; and the network system wherein said server broadcasts said common information to said clients using user datagram protocol.

A further embodiment includes a client system embodiment, comprising:

processor apparatus having input means for receiving user datagram information;

processor apparatus having output means for rebroadcasting said user datagram information;

processor control apparatus for determining whether said user datagram information is received from another client system; and processor control apparatus for inhibiting rebroadcasting where said datagram is received from another client system.

Client system embodiments further include:

processor control apparatus for controlling the rebroadcast of said user datagram information when said user datagram information received on said input means is not received from another client system;

the client system wherein said rebroadcasting occurs periodically at over fixed time intervals with the fixed time intervals determined randomly; and the client system wherein said processor control apparatus rebroadcasts said user datagram information when said client system fails to receive said user datagram information from another client within a fixed cycle of time.

Another embodiment of the invention provides a program storage device readable by a computer machine, tangibly embodying a program of instructions executable by the machine to perform method step for causing said computer machine to carry out decision making in client computer systems receiving broadcast information in a network, comprising:

analyzing said broadcast information input signals to determine their source; and rebroadcasting said input signals when the input signals are received from a server computer until one of a plurality of client computers in said network is selected to rebroadcast said input signals to the remaining client computers.

Program storage embodiments also includes the steps of:

selecting randomly said one of a plurality of client computers selected to rebroadcast said input signals;

inhibiting the rebroadcasting of said input signals when said input signals are received from another client computer;

the rebroadcasting said input signals periodically at a fixed time intervals with the fixed time interval determined randomly for each client computer;

selecting one of a plurality of client computers to rebroadcast by identifying the client computer with the shortest fixed time interval for rebroadcasting;

commencing rebroadcasting of said input signals from said server computer when said selected client fails to provide rebroadcast input signals; and the rebroadcasting of input signals from said server computer when said selected client fails is carried out until another server computer of said plurality of server computers is randomly selected.

Further embodiments are described in the appended dependent claims.

Further aspects of the invention will now be described, by way of preferred implementation and examples.

BRIEF DESCRIPTION OF THE DRAWING

The above and other items, features and advantages of the invention will be better understood by reading the following more particular description of the invention in conjunction with the accompanying drawings wherein.

DETAILED DESCRIPTION OF THE DRAWINGS

Figure 1:
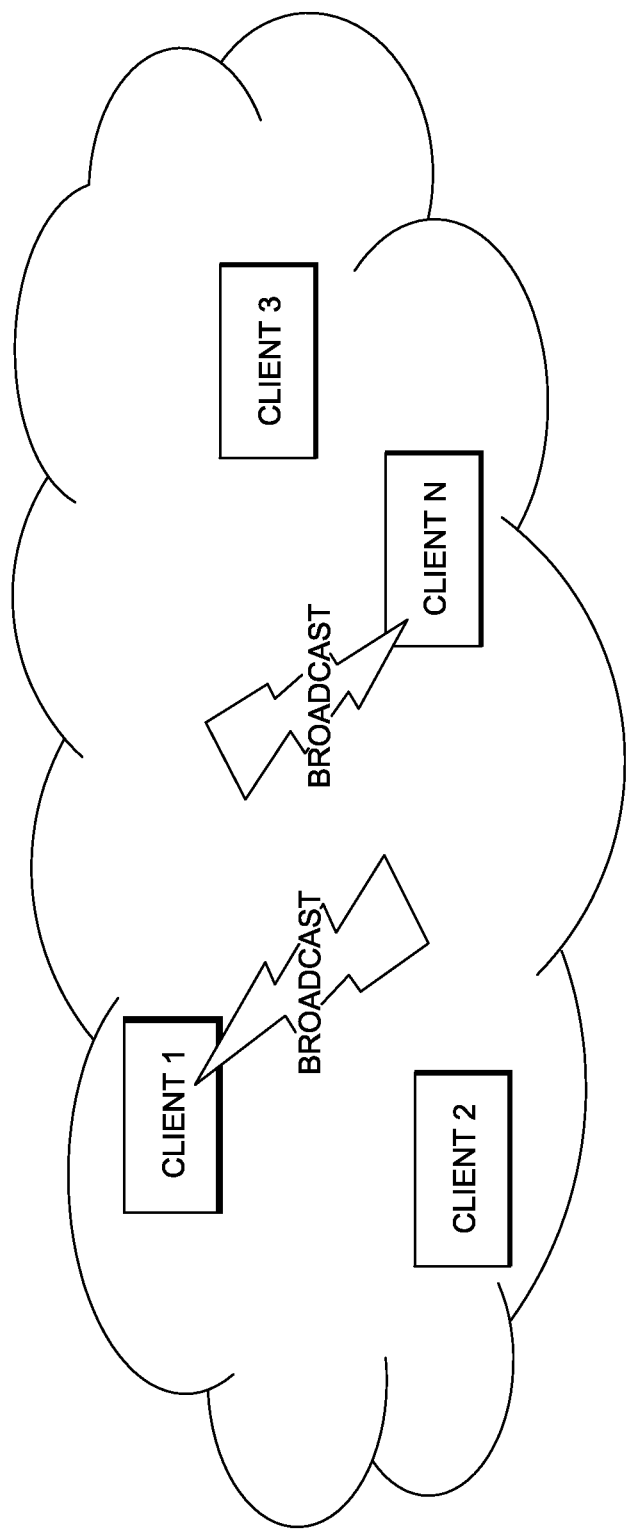
FIG. 1 shows a conceptual arrangement of a plurality of clients receiving and broadcasting information.

With reference to FIG. 1, there is shown a conceptual arrangement of a plurality of clients, two of which are shown broadcasting. Initially, when a server broadcasts information, all clients receive and rebroadcast the broadcast information from a server. This rebroadcast by the clients is carried out in their own segment, i.e. the area to be reached by broadcasting packets or broadcast address.

Broadcast information is typically common information to be used by all of the clients within a broadcast segment. The segment may be a local area network (LAN) or larger than the LAN or a subset of the LAN. The common information may be broadcast to any of a number of segments but for purposes of description of the invention, reference will be made to clients in a network within a segment.

Broadcast information may be sent using a variety of protocols but in accordance with the present invention, common broadcast information is sent using User Datagram Protocol (UDP).

Conventional UDP is a connectionless oriented protocol that uses an Internet Protocol (IP) address for the destination host or client and a port number to identify the destination application. Thus, the UDP process involves a transport layer that sits on top of the base IP to transmit a datagram that comprise header information and the data or information inself.

In accordance with the present invention, a modified UDP process is employed to ensure that all clients within a segment, i.e. a "plurality" of clients computers, receive the UDP transmitted broadcast information from the server. This is done by electing one of the client computers as a relay server to rebroadcast the server UDP transmitted broadcast information. Each client computer determines from the rebroadcast information, whether the information comes from the server or another client computer selected to rebroadcast the information. If it determines that the broadcast information is from another server, it stops rebroadcasting. If the client computer selected for rebroadcasting fails to rebroadcast the information, another client computer takes over the rebroadcast of information from the server. The terms "client", "client computer", "client workstation", "client system" are used interchangeably and are intended to mean clients in a network arrangement as is understood by those skilled in the art.

Figure 2:
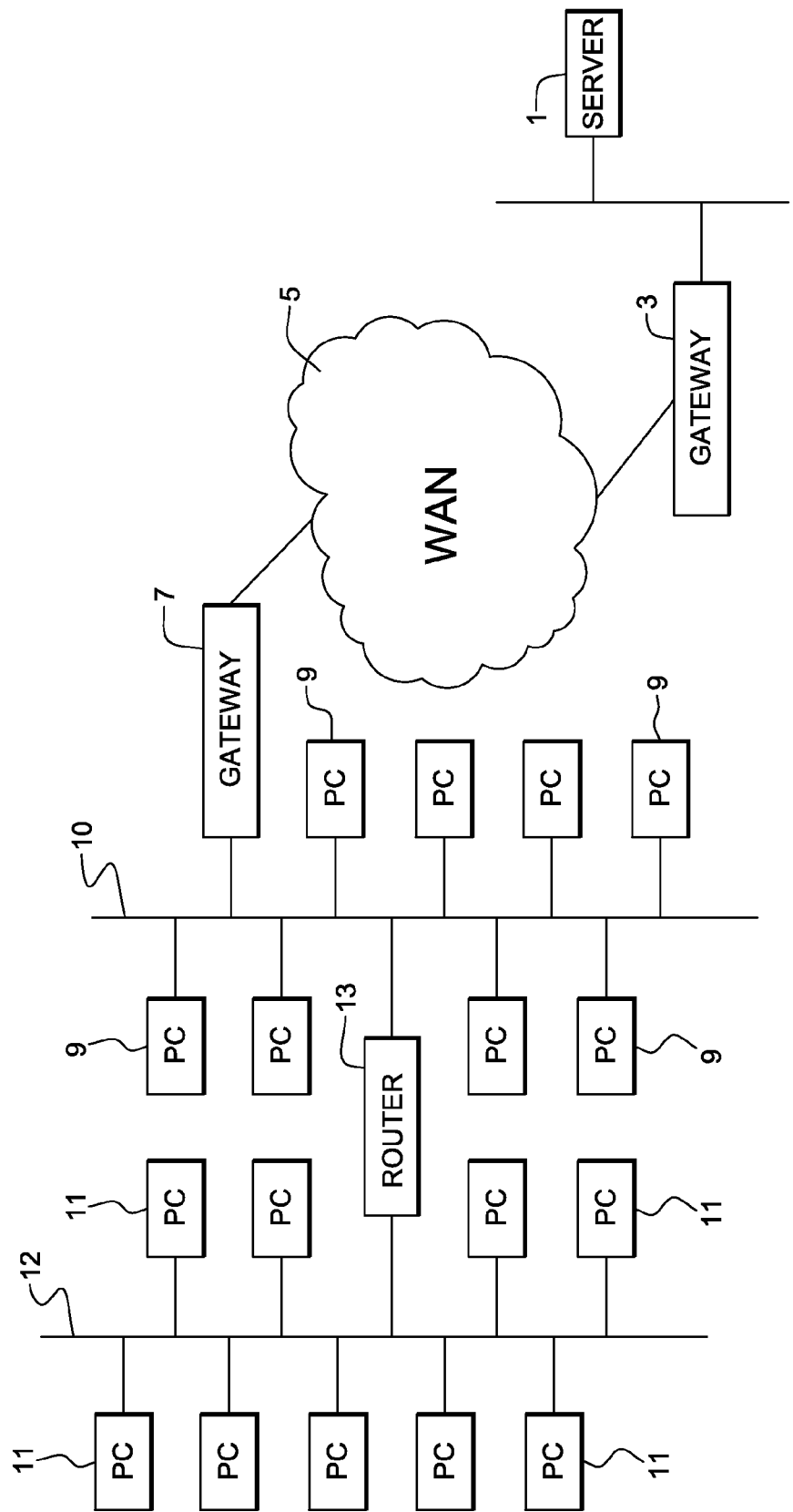
FIG. 2 shows a network diagram as an example of network topology that may be employed in carrying out the present invention.

FIG. 2 shows a network diagram of a typical network topology arrangement. Server 1 acts to send UDP information over gateway 3 to Wide Area Network (WAN) 5. Gateway 7, in turn, receives the information from WAN 5 to send to a plurality of clients computers via bus 10. The computers are shown here as PCs 9 and PCs 11 with PCs 9 connected to bus 10 and PCs 11 connected to bus 12. Bus 12 is connected to bus 10 through router 13. Client computers may be any of a variety of computer arrangement but PCs are shown here. Similarly, Server 1 may be any of a variety of well known and commercially available computer arrangements configured to act as a network server to manage network resources.

Figure 3:
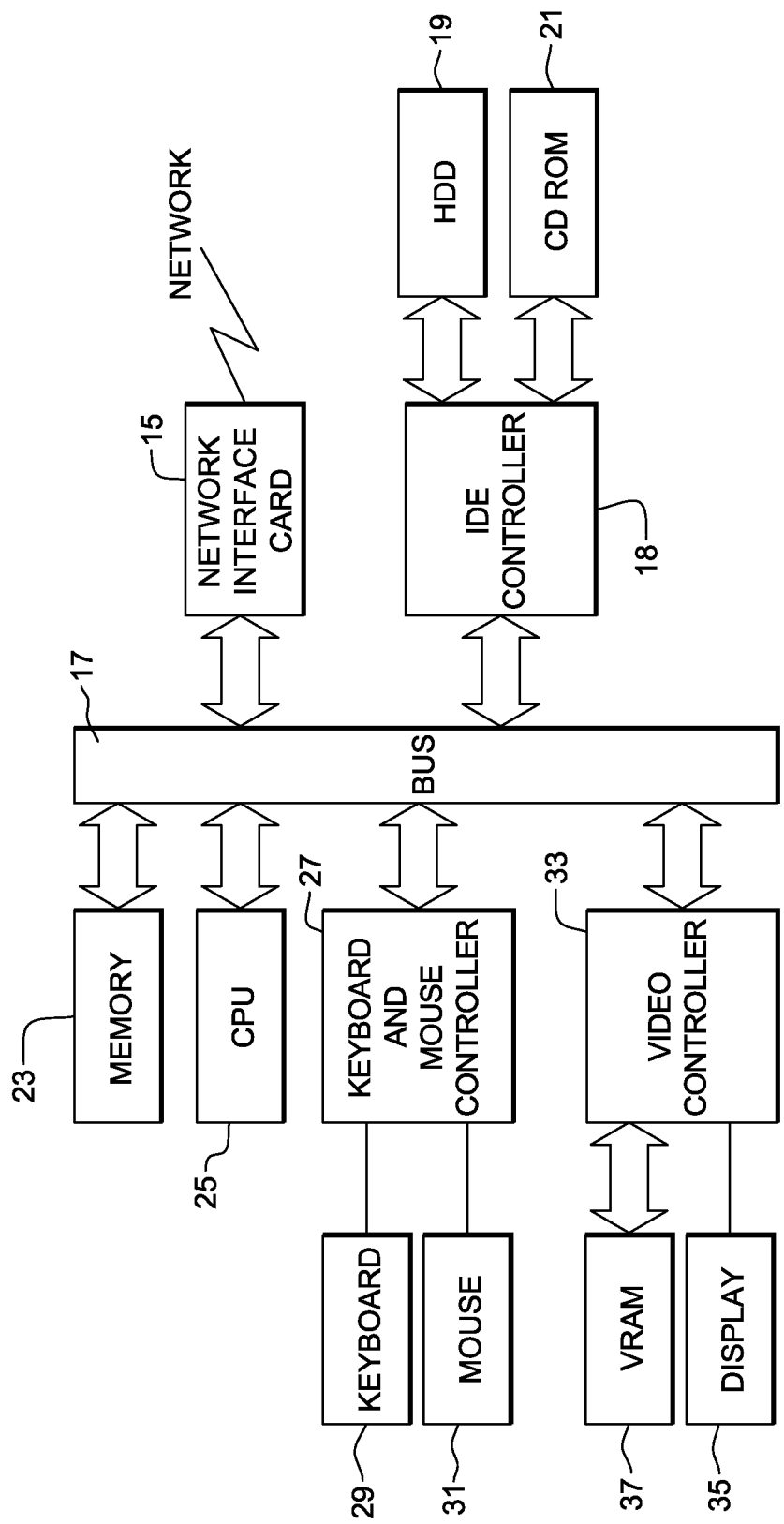
FIG. 3 shows a block diagram of an example of a data processing or client computer system that may be employed in carrying out the present invention.

FIG. 3 shows a block diagram of an example of a client computer system arrangement, which system arrangement could include, among other arrangements, a PC arrangement. As shown, the client computer system includes apparatus, such as, a Network Interface Card 15 for interfacing the computer system Bus 17 to the network. Also, included is Integrated Device Electronics (IDE) controller 18 for connecting Hard Disk Drive (HDD) storage device 19 and compact disk (CD) storage ROM device 21 to bus 17.

Further connected to Bus 17 is Memory 23 and Central Processing Unit (CPU) apparatus 25. Keyboard and Mouse Controller 27 also connects Keyboard 29 and Mouse 31 to Bus 17. Video Controller 33 further connects Video RAM 37 and Display 35 to Bus 17.

Figure 4:
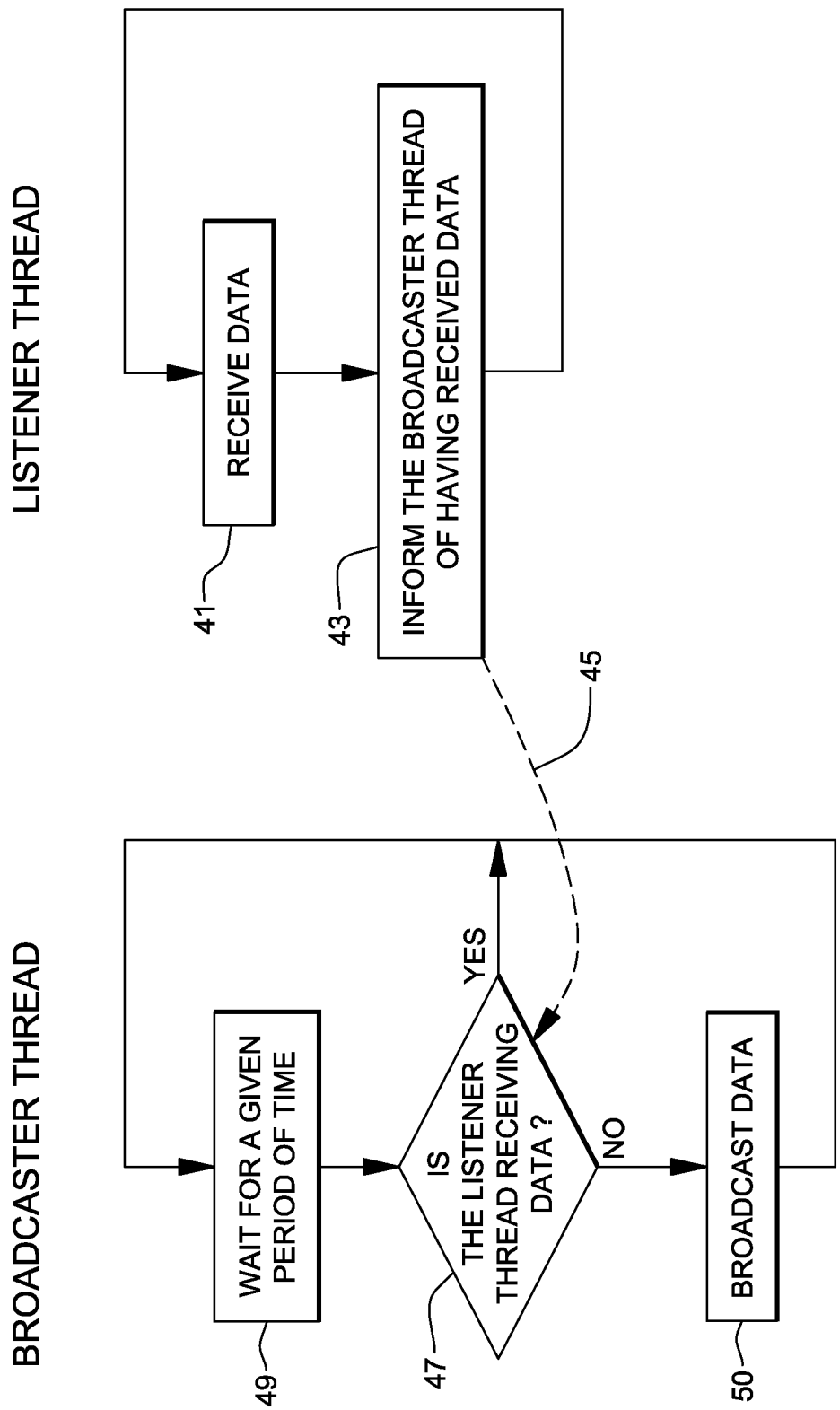
FIG. 4 shows a general block diagram of the manner in which client computers carry out "broadcast" and "listen" operations in the network.

FIG. 4 depicts general flow diagrams of how the "Broadcaster" thread and "Listener" thread interact. The listing thread in the client computer acts to "receive data", as shown by block 41, and informs the "Broadcaster" thread of having received data, as shown by block 43 and dotted line 45. If the "Listener" thread receives data, as determined at block 47, the process "waits" for a predetermined or "given period of time", as shown at block 49. After a predetermined period of time, the process loop back to block 47 and if no data has been received after the predetermined period of time, the process then acts to "broadcast data", as shown by block 50, as received from the broadcast server.

Figure 5:
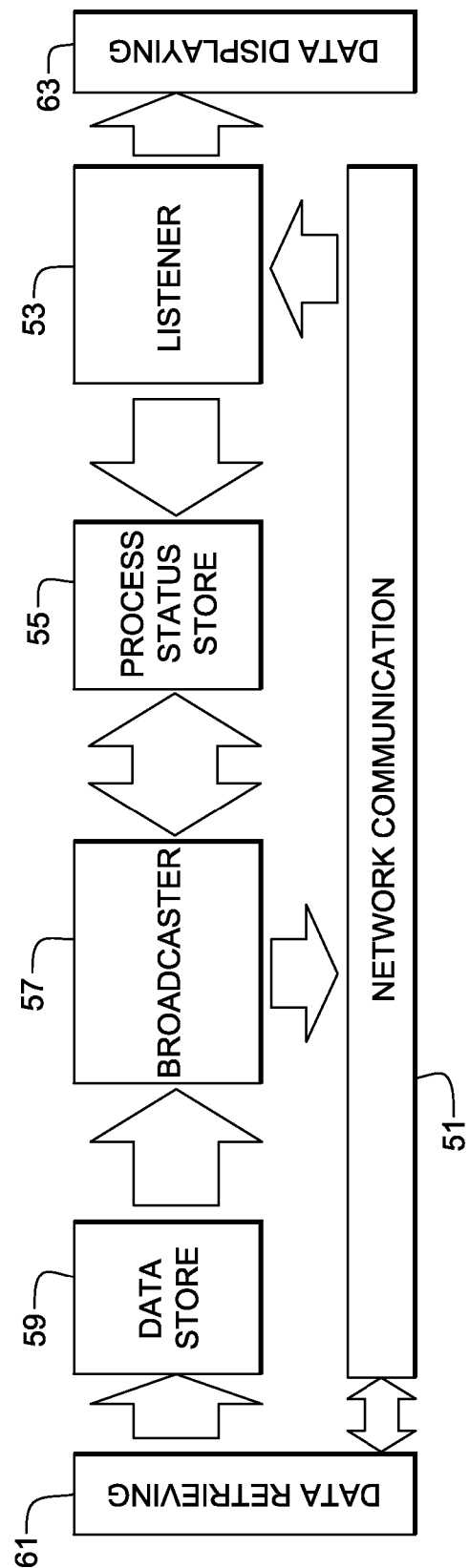
FIG. 5 shows a functional block diagram of the manner in which processors carry out client computer operations in the network.

The block diagram of FIG. 5 represents the manner in which the client computer systems in the network each operate to carry out the processing required to listen to rebroadcast the common information sent by network server. Network Communication, represented by block 51, acts to send and receive information or data from network interface apparatus, such as, Network Interface Card 15, as shown in FIG. 3. Listener block 53 represents the operation of receiving information from the Network Communication block 51 and changes the status of the Process Status Store function, as represented by block 55. Process Status Store acts to store process status which are the Listener 53 status and Broadcaster 57 status.

The Data Store function, as represented by block 59, acts to store in memory the UDP broadcast application information or data as received from the server computer to be rebroadcast by the Broadcaster 57 operation. Broadcaster 57 sends the information to be rebroadcast to Network Communication 51 operation. Broadcaster 57 also acts to change the status of Process Status Store 55.

Data retrieving, as carried out by the Data Retrieving operation, represented by block 61, retrieves application data, i.e., the UDP broadcast information from the server computer and stores it in Data Store 59 memory. If the operation of Listener block 53 receives rebroadcast information from another client computer by checking the status of process status store 55, the data retrieving operation will do nothing, i.e., sleep. Data Displaying device 63 displays the information received by the Listener block 53.

Figure 6:
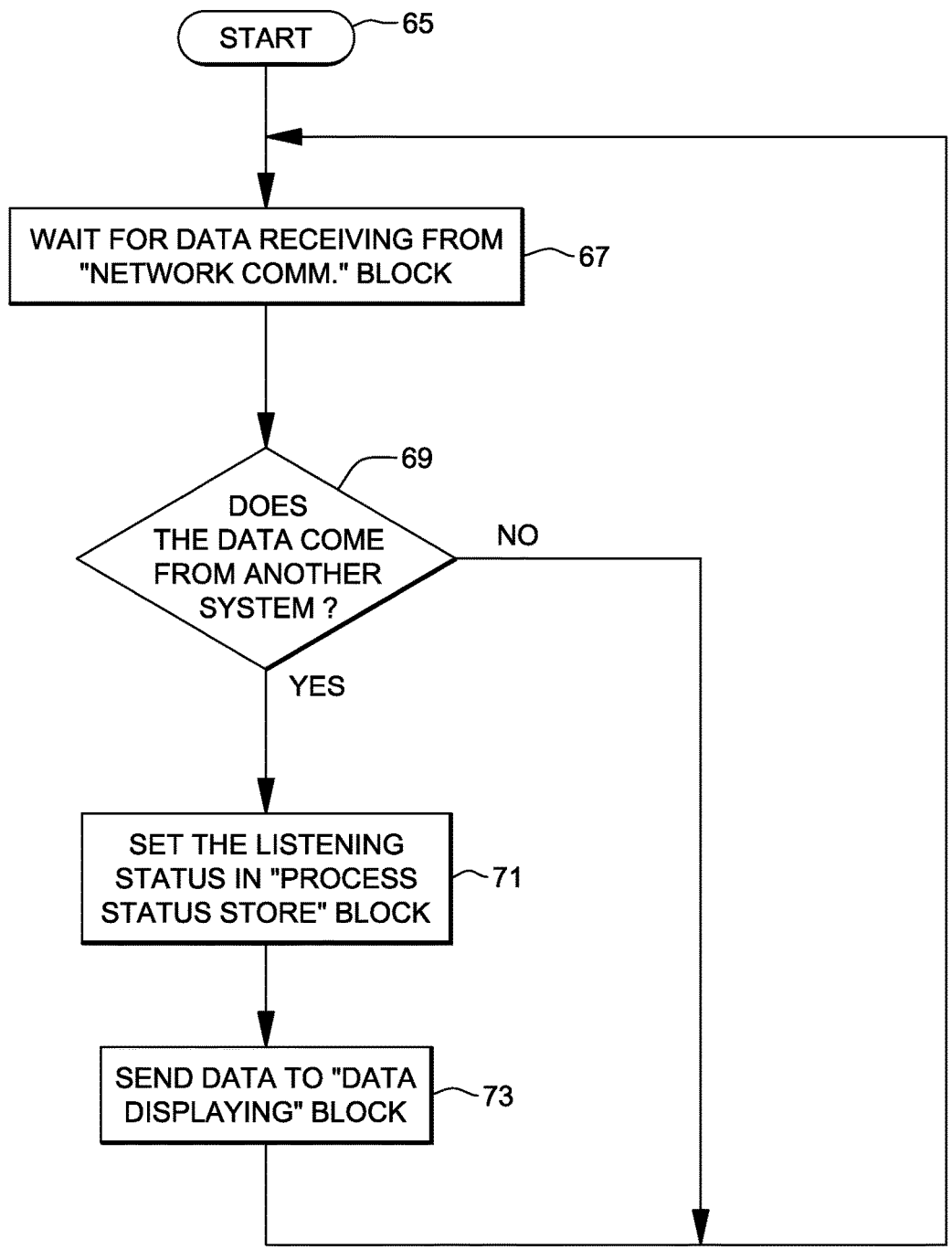
FIG. 6 shows a flow chart of the "Listener" operation of the client computer systems.

The operation of Listener block 53 in client computers is shown in more detail in the flow chart represented in FIG. 6. The process starts at block 65 which leads to the instruction to "wait for data receiving from Network Communication block", which is block 51 in FIG. 5. The decision "does the data come from another system", as represented by block 69, is then made. This query determines if the data or information received comes from a rebroadcast by a client computer system in the network segment or comes from the network server. This determination is made from the IP address and port number of the received information.

Where the information is determined to come from another client computer system, "the listening status in Process Status Store block" 55, shown in FIG. 5, is "set", as shown by the step of block 71 in FIG. 6. The data is then sent to Data Displaying apparatus, such as a monitor, as shown by block 63 in FIG. 5. This step is represented by block 73 in FIG. 6. Where the data is determined by block 69 to not come from another client computer system, the process returns directly to block 67 to wait for data coming from Network Communication block 51 shown in FIG. 5.

As used herein the terms "data" and "information" are employed interchangeably meaning that which is received and transmitted by the network clients and network server. "Broadcast information" is used to identify information broadcast by the network server. "Rebroadcast information"

is used to identify information received from the server and resent in broadcast manner by a selected client computer or computers acting as a relay server to the other client computers in the network segment.

Figure 7A:
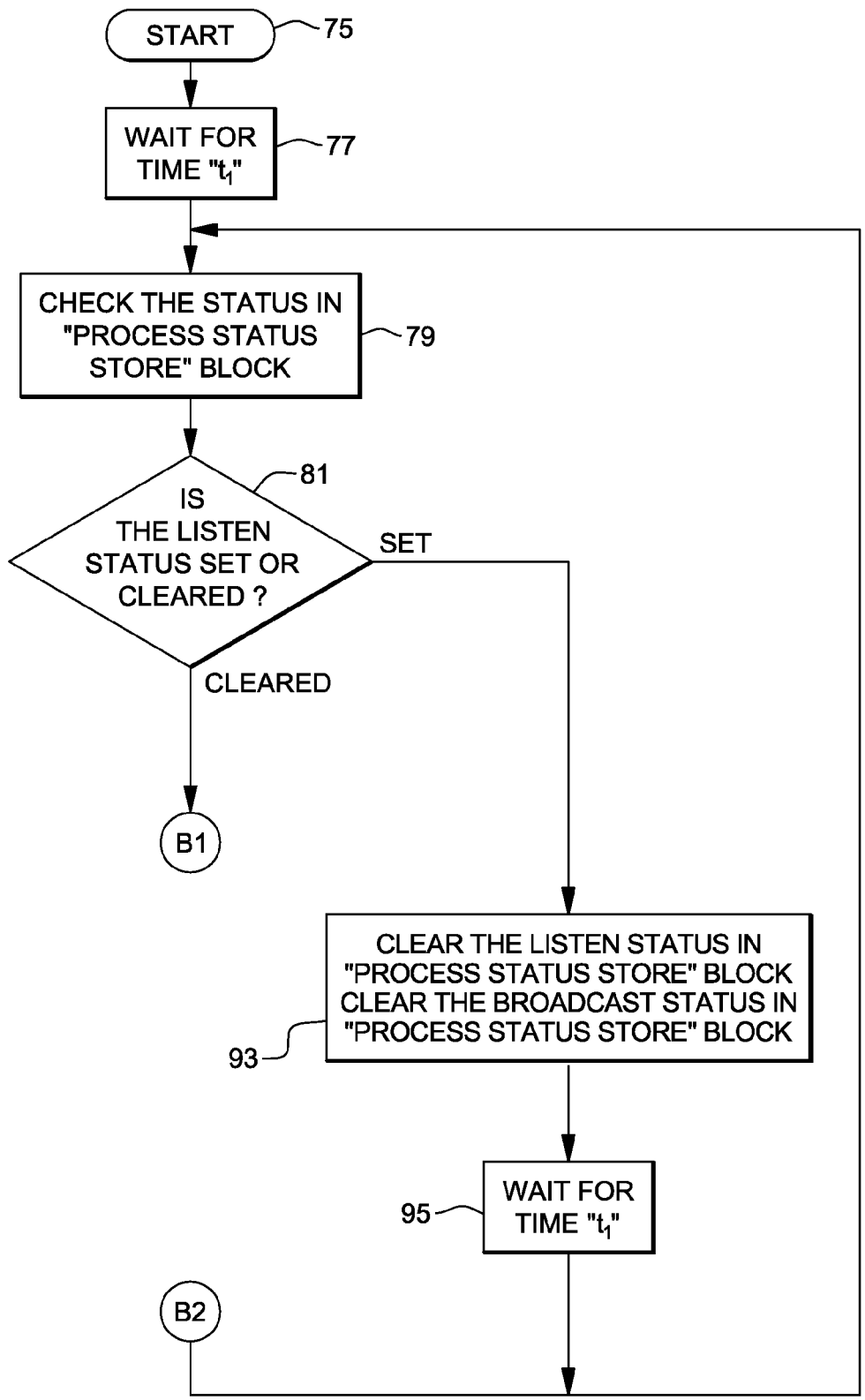
FIG. 7A shows part of the flow chart for "Broadcast" operation of the client computer systems.
Figure 7B:
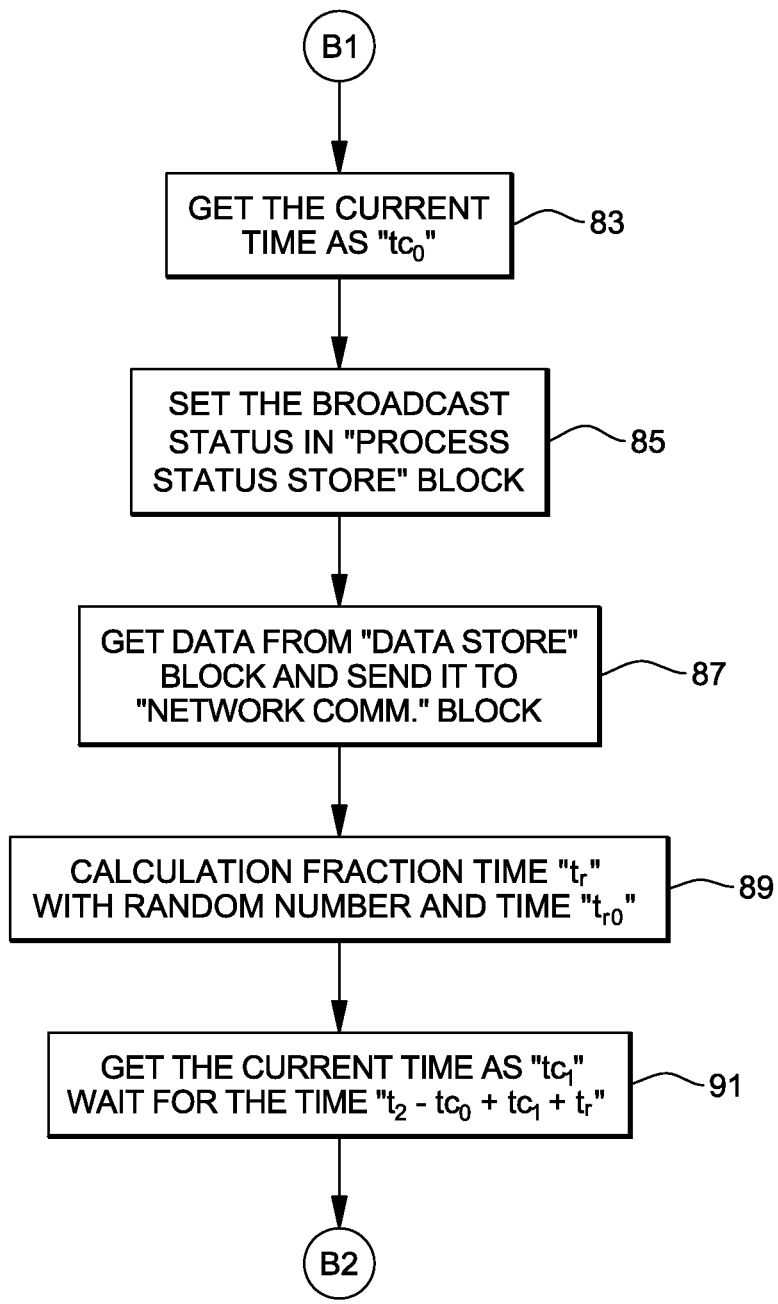
FIG. 7B shows another part of the flow chart for "Broadcast" operation of the client computer systems.

FIGS. 7A and 7B show a flow chart for the operation of the "broadcaster" operation shown by Broadcaster block 57 in FIG. 5. The broadcaster operation starts at block 75 wherein an instruction "to wait for the time '$t_1$'" is given, as shown in block 77. Time "$t_1$", is a given parameter of a fixed period of time. After time "$t_1$", an instruction to "check the status in 'Process Status Store' block" 55 in FIG. 5 is given. This instruction is shown by block 79 in FIG. 7A and the instruction acts to determine if "the listen status" in the "Process Status Store block" is "set" or "cleared", as shown by block 81.

If the "listen status" in "Process Status Store" block is "cleared" indicating that the received data does not come from another client computer, the process goes to the instruction in block 83 in FIG. 7B wherein "the current time as '$tc_0$'" is obtained and set. In addition, as stated in the next block 85, the instruction is given, to "set the broadcast status in 'Process Status Store' block" 55, shown in FIG. 5, thus indicating that data will be rebroadcast by this client computer. Then, an instruction is given, as shown is block 87 of FIG. 7B to "Get data from 'Data Store' block and send it to 'Network Comm.' block. Thus, as shown in FIG. 5, data in Data Store block 59, as retrieved by Data Retrieving block 61 from the network broadcasting server, is sent to Network Communication block 51 to broadcast over the network.

As further shown in FIG. 7B, the next step, as shown by block 89, is to "Calculate fraction time '$t_r$', with random number and time '$t_{r0}$'". In this regard "$t_r$" is a random number whose range is $0<=t_r<t_{r0}$ with $t_{r0}$ a given parameter.

With fraction time "$t_r$" calculated, the next instruction, shown in block 91 of FIG. 7B, is to "Get the current time as '$tc_1$'" and "Wait for the time "$t_2-tc_0+tc_1+t_r$". The time "$t_2$" is also a given parameter with "$t_2$" being less than "wait" time "$t_1$", another given parameter. The time "$-tc_0+tc_1$" represents the width of the pulse from Broadcaster 57. After waiting for the time "$t_2-tc_0+tc_1+t_r$", the process returns to the block 79 instruction to "Check the status in 'Process Status Store' block".

Again, with respect to FIG. 7A, if this the "listen status" of block 81 is "set", meaning the data comes from another client computer, the instructions "Clear the listen status in 'Process Status Store' block" and "Clear the broadcast status in 'Process Status Store" block "are carried out, as shown by block 93. After these clearing instructions, the process waits according to the instructions to "Wait for the time '$t_1$'", as shown in block 95. After waiting for the time "$t_1$" the process returns the instruction "Check the status in 'Process Status Store' block", as shown by block 79.

Thus, if the "listen status" of block 81 is "cleared", meaning the received data did not come from another client system, the process waits a time "$t_2-tc_o+tc_1+t_r$" to broadcast with $t_r$ being a random number and then checks the 'Process Status Store' block 79. If the "listen status" status of block 81 is "set", meaning the received data came from a client computer, the process waits a given or fixed time "$t_1$" and then checks "Process Status Store" block 79. Where the "listen status" is "set", the "broadcast status" in "Process Status Store" block 55 (FIG. 5) is "cleared" by the instruction of block 93 in FIG. 7A. Where the "listen status" is "cleared", the "broadcast status" in "Process Status Store" block 55 is "set" by the instruction of block 85 in FIG. 7B since the client computer did not receive the received data from another client computer and is in the process of broadcasting over the network, as shown in block 87.

Figure 8:
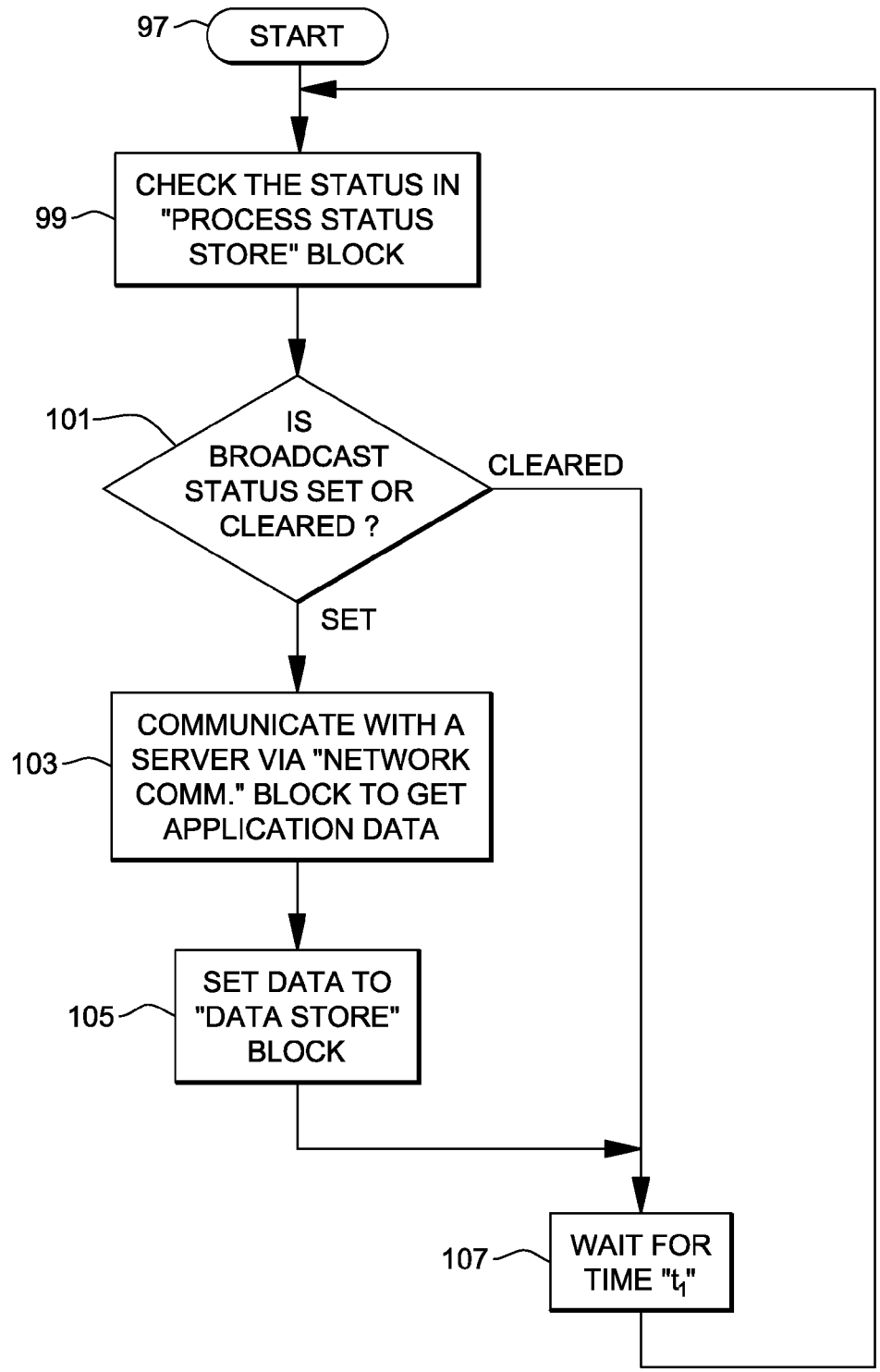
FIG. 8 shows a flow chart of the "Data Retrieving" operation of the client computer systems.

With reference to FIG. 8, there is shown a process for carrying out the operation of "Data Retrieving" block 61 in FIG. 5. The process starts at block 97 wherein an instruction is given to "check the status in 'Process Status Store' block" (block 55 in FIG. 5). A determination is then made in block 101 as to whether the "broadcast status" is "set" or "cleared". If "set", indicating that the client computer is in the process of sending data, an instruction is given by block to "Communicate With A Server Via 'Network Comm.' Block to get Application Data", as shown by block 103.

After communicating with a server to obtain application data, the data is "set" to "Data Store" block 59 in FIG. 5 by the instruction "Set to 'Data Store' block" shown by block 105 in FIG. 8. The process then waits for a time "$t_1$" before checking the status in "Process Status Store" block 55 in FIG. 5. This instruction to "wait" is shown by block 107 in FIG. 8. Thus, the process then waits for a time "$t_1$", before checking the status in "Process Status Store" block 55.

Figure 9:
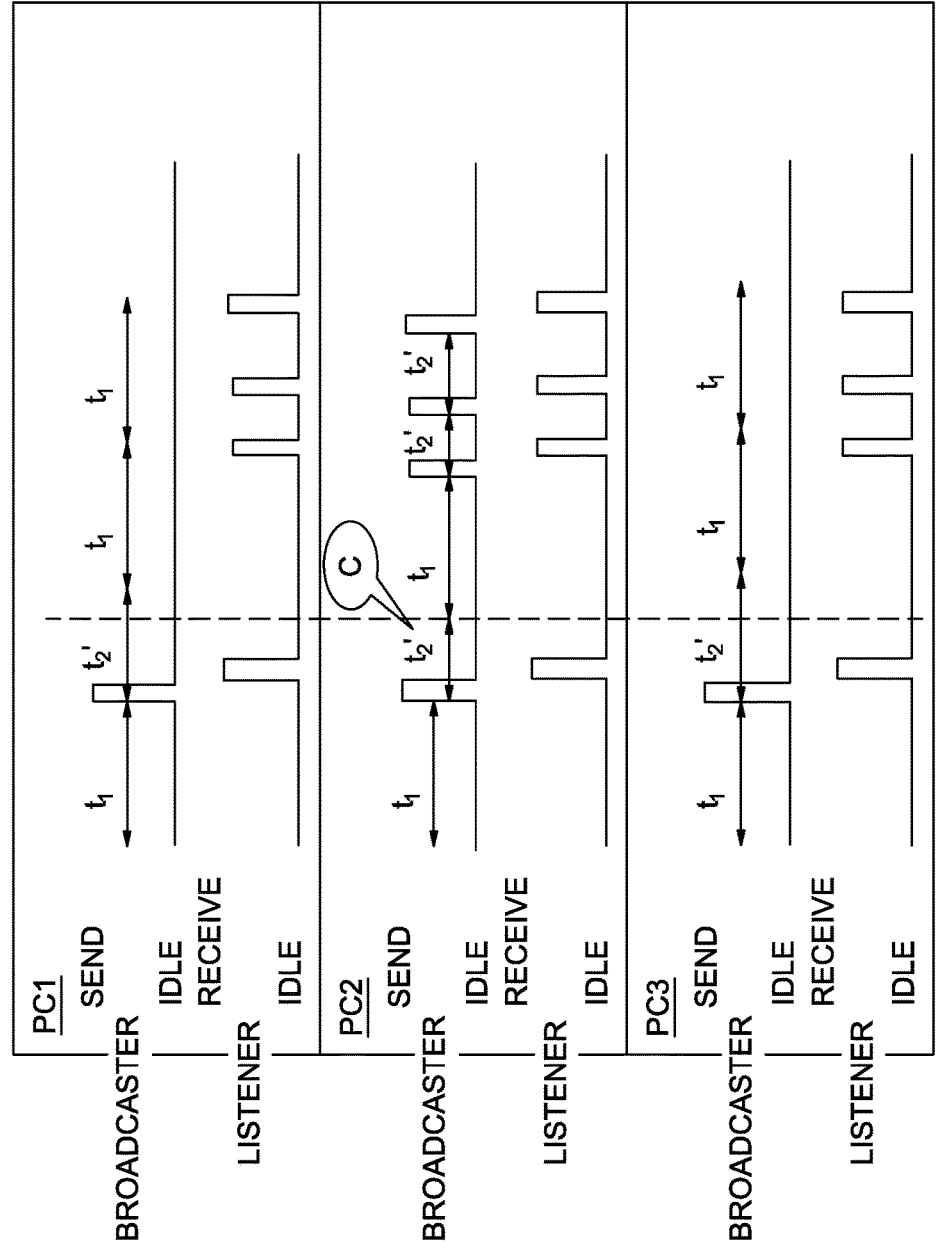
FIG. 9 shows a timing diagram of an example of the "converging" of broadcasting to a single client computer system from the broadcasting of a plurality of client computer systems.
Figure 10:
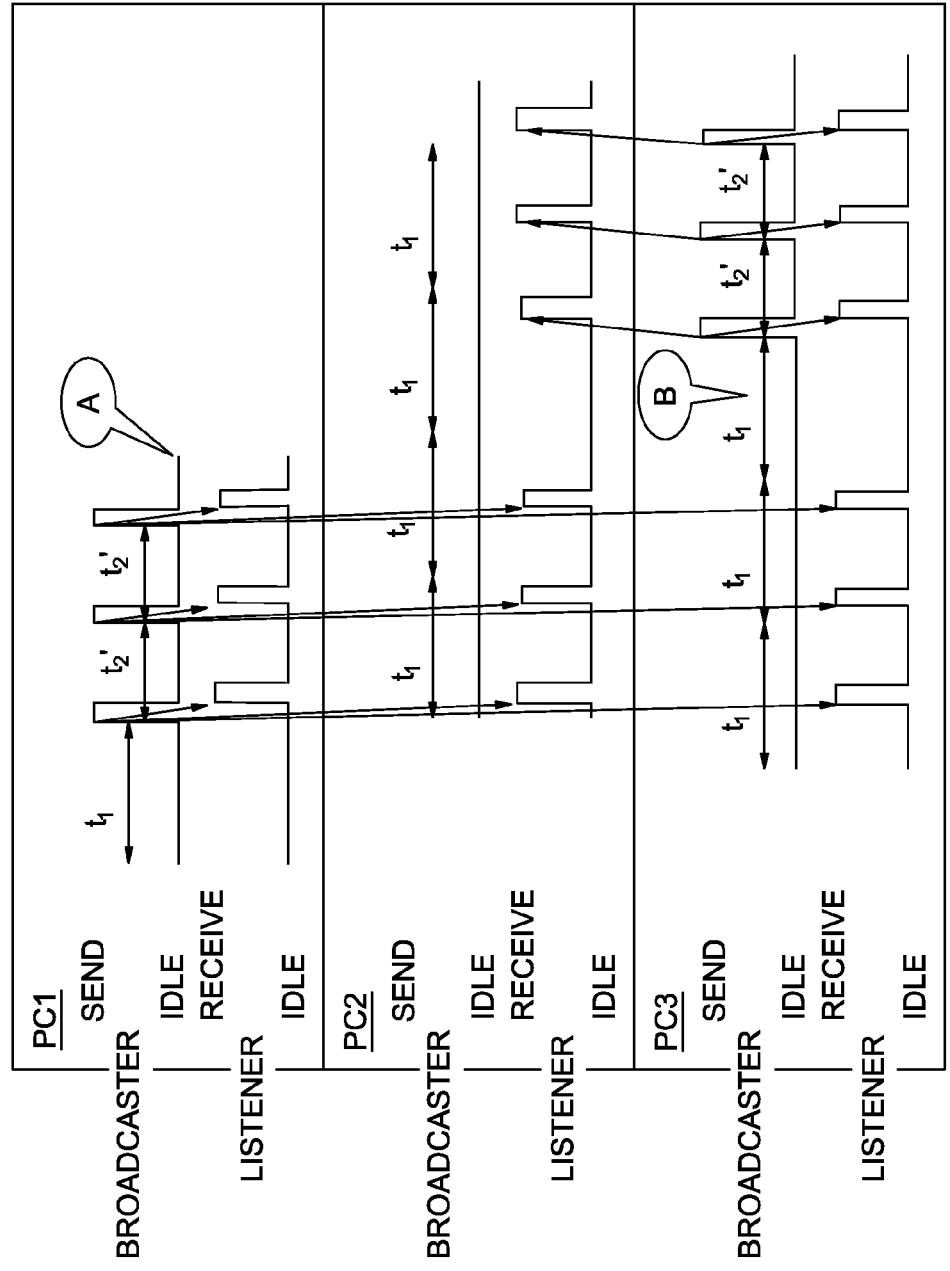
FIG. 10 shows a timing diagram of an example of the "taking over" of rebroadcasting by a client computer system when a previously selected client computer system fails to rebroadcast server computer broadcast information.

FIGS. 9 and 10 show timing diagrams representing the manner in which the client computers interrelate with one another in carry out rebroadcasting network data. Although reference is made in FIGS. 9 and 10 to PC's as client computers, it is understood that the reference is by way of example and that operation would be the same for any type of client computer.

FIG. 9 shows the manner in which 3 PCs interact to converge to a leader to do the rebroadcasting of Server Application Data. Initially, all client computers, such as PCs, start rebroadcasting Server Application Data. The "Listener" operation, shown in block 53 in FIG. 5, is "set" for each client computer since all client computers receive data from another system. This is shown by block 71 in FIG. 6. Thus, each client computer operates to "listen" and "rebroadcast" at different fixed time intervals "$t'_2$".

The time fixed interval "$t'_2$" is equal to "$t_2$"+"$t_r$" where "$t_2$" is a fixed number and "$t_r$" a random number. Thus, each client computer has a different fixed time interval "$t'_2$" as determined by "$t_r$". As shown in FIGS. 9 and 10, the period of each "$t'_2$" starts from the left edge of the Broadcaster pulse. However, the actual "waiting" period starts at the right edge of the Broadcaster pulse. Thus, the "waiting" period, as shown in FIG. 7B, is "$t_2-tc_0+tc_1+t_r$" with "$+tc_1-tc_0$" being the pulse width.

Since each client computer generates its own rebroadcast time "$t'_2$" randomly and thus has a different duration fixed time interval "$t'_2$", each client computer rebroadcasts at different times. Since the listening status is "set" for all client computers, all client computers wait the fixed cyclic time period $t_1$, which time period is the same fixed time period for each client computer. Since each client computer process rebroadcasts at different times "$t'_2$", then each client computer begins the fixed "wait" time period $t_1$ from a different point in time. Thus, as can be seen in FIG. 9, the client computer processes are not synchronized. The client computer with the shortest rebroadcast time interval for "$t'_2$" emerges as the one selected to take over rebroadcasting network server broadcast data since it is the first to complete a full fixed time interval "$t_1$". Thus, PC2 is selected since it has the shortest time interval "$t'_2$", as shown at point C in FIG. 9.

FIG. 10 shows the manner in which one client computer takes over after a client computer previously selected to rebroadcast server data fails, for some reason, to rebroadcast the data. As shown, PC1 is the client computer previously selected to rebroadcast server data. The rebroadcast stops, as shown at point A, for any of a variety of reasons. Since the rebroadcast from PC1 stops, then PC2 and PC3 wait time "$t_1$" before rebroadcasting. As shown in FIG. 10, since PC3 becomes the first PC to complete the fixed time interval cycle "$t_1$", then PC3 takes over rebroadcasting server application data. As previously noted, these fixed interval cycle times "$t_1$" are carried out after the random "$t'_2$" broadcast cycle times, and thus occur at different times.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A network system, comprising:
   a network server arranged to broadcast common information to a plurality of clients in a network of clients and allow for rebroadcasting the common information by a selected client within a segment of clients of the network of clients to the other clients within the segment of clients;
   a plurality of clients connected to the server through said network to receive the common information;
   the segment of clients of the network of clients arranged to automatically select from among clients within said segment of clients of said network of clients at least one client to rebroadcast said common information to the remaining clients within said segment of clients;
   the remaining clients within said segment of clients arranged to block rebroadcasting said common information from said network server when said at least one client is selected to rebroadcast said common information to said remaining clients within said segment of clients; and
   said segment of clients arranged to automatically select another client within said segment of clients of said network of clients to rebroadcast said common information to the remaining client within said segment of clients should said at least one client fail to rebroadcast said coming information.

2. The network system as set forth in claim 1 wherein said at least one client automatically selected from among said clients within said segment of clients to rebroadcast said common information from said network server is selected from among said clients within said segment of clients by causing said segment of clients to each randomly generate a different fixed time intervals at each client for each client to rebroadcast said common information.

3. The network system as set forth in claim 2 wherein the client randomly generating the shortest time interval to rebroadcast said common information is selected from among said clients within said segment of clients for rebroadcasting said common information.

4. The network system as set forth in claim 3 wherein initial broadcast of said common information from said network server to said plurality of clients acts to cause each client within said segment of clients to rebroadcast said common information to each of the remaining clients within said segment of clients.

5. The network system as set forth in claim 4 wherein the client within said segment of clients each rebroadcasting said common information from said server is selected from among said plurality of clients within said segment to continue rebroadcasting said common information by randomly generating the shortest time interval to rebroadcast said common information.

6. The system network as set forth in claim 5 wherein each of the clients within said segment of clients randomly generating a different time interval to rebroadcast said common information has added thereto a fixed interval of time before each client rebroadcasts.

7. A client system for receiving common broadcast information from a network server;
   said client system being one among a plurality of client systems each of which client system includes processing apparatus arranged to receive said common broadcast information and rebroadcast said common broadcast information;
   said processor apparatus in said client system arranged to determine whether received common broadcast information originates from said network server or another client system from among said plurality of client systems and when said common broadcast information is received from another client system said processor apparatus does nothing with the received common broadcast information; and
   said processor apparatus in each client system further arranged to initiate a rebroadcast operation of said common broadcast information received from said network server when said common broadcast information is not received from said another client system.

8. The client system as set forth in claim 7 wherein said rebroadcast operation starts after a fixed period of time with said fixed period of time occurring randomly.

9. The client system as set forth in claim 8 wherein said client system is selected to rebroadcast said common broadcast information when it is the first client system from among said plurality of client systems to rebroadcast said common broadcast information received from said network server.

10. The client system as set forth in claim 9 wherein subsequent failure of said selected client system to rebroadcast said common broadcast information acts to cause selection of another client system from among said plurality of client systems to rebroadcast said common broadcast information.

11. The client system as set forth in claim 10 wherein said common broadcast information is received using User Datagram Protocol.

12. A computer program product for enabling a client computer system, being one among a plurality of client computer systems in a network, to carry out rebroadcast decisions with regard to received common broadcast information from a network server in said network, the computer program product comprising a computer readable storage medium having program instructions embodied therewith, the program instructions executable by said client computer system to:
   receive said common broadcast information;
   determine whether said received common broadcast information originates from said network server or from another client computer system from among said plurality of client computer systems;

do nothing when said common broadcast information is received from said another client computer system from among said plurality of client computer systems; and initiate a rebroadcast operation when said common broadcast is not received from another client computer.

13. The computer program product for enabling a client computer system as set forth in claim 12 wherein said rebroadcast operations occurs after a fixed interval of time set randomly.

14. The computer program product for enabling a client computer system as set forth in claim 13 wherein said client computer system acts to rebroadcast said common broadcast information when it is the first client system from among said plurality of client computer systems to rebroadcast said common broadcast information.

15. The computer program product for enabling a client computer system as set forth in claim 14 wherein subsequent failure of said client system to rebroadcast said common broadcast information acts to cause another client system from among said plurality of client system to rebroadcast said common broadcast information.

16. The computer program product for enabling a client computer system as set forth in claim 15 wherein said common broadcast information is received using User Data Protocol.

* * * * *